(12) United States Patent
Zhu (10) Patent No.: US 10,757,661 B1
(45) Date of Patent: Aug. 25, 2020

(54) COMMUNICATION DEVICE WITH PASSIVE PROXIMITY DETECTION

(71) Applicant: MOTOROLA MOBILITY LLC, Chicago, IL (US)

(72) Inventor: Bao Sheng Zhu, Naperville, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/576,823

(22) Filed: Sep. 20, 2019

(51) Int. Cl.
*H04W 52/24* (2009.01)

(52) U.S. Cl.
CPC ....... *H04W 52/246* (2013.01); *H04W 52/241* (2013.01); *H04W 52/245* (2013.01)

(58) Field of Classification Search
CPC ............. H04W 52/246; H04W 52/245; H04W 52/241; G06F 1/1626; G06F 1/1684; G06F 2203/04108; G06F 2203/04808
USPC ........................................................ 455/522
See application file for complete search history.

(56) References Cited

U.S. PATENT DOCUMENTS 10,133,304 B2 * 11/2018 Alameh ................ G06F 1/1626

\* cited by examiner

*Primary Examiner* — Shaima Q Aminzay
(74) *Attorney, Agent, or Firm* — Yudell Isidore PLLC (57) ABSTRACT

A communication device includes a frontend that is communicatively coupled to the antenna(s) and that converts downlink signals to downlink baseband signals and uplink baseband signals to uplink signals. A memory contains a passive proximity detection module and a baseline threshold value. A communication device includes a controller that is communicatively coupled to the frontend and a memory. A controller executes a module contained in memory to enable the communication device to receive via the antenna(s) a downlink reference signal from a radio access network. The frontend determines a downlink characteristic of the downlink reference signal. Based on comparison to the baseline threshold value, the controller determines whether a person is in proximity to the antenna(s) based on the downlink characteristic being indicative of a proximity to the person. The controller limit transmits power level of the frontend in response to determining the proximity to the person.

20 Claims, 6 Drawing Sheets

COMMUNICATION DEVICE WITH PASSIVE PROXIMITY DETECTION

1. TECHNICAL FIELD

The present disclosure relates generally to communication devices, and in particular to communication devices capable of detecting presence of a human.

2. DESCRIPTION OF THE RELATED ART

Extremely high frequency (EHF) is the International Telecommunication Union (ITU) designation for the band of radio frequencies in the electromagnetic spectrum from 30 to 300 gigahertz (GHz). Radio waves in EHF band have wavelengths from ten to one millimeter, so EHF band is also called the millimeter wave band. Radiation in EHF band is called millimeter waves (mmWave). Cellular network technology has developed in stages that are referred to as generations (G). Cellular communications have expanded into multiple communication bands and modulation schemes through the evolution of the telecommunications standard from first generation (1G), second generation (2G), third (3G), fourth generation (4G), and now fifth generation (5G). 5G communication uses a communication band or frequency spectrum in what is also referred to as millimeter wave bands (24-86 GHz).

As cellular network technology adds additional communication bands, constraints are imposed on transmission characteristics in the additional communication bands. For example, regulatory limits are imposed on transmit power ("transmit power cutback") as a function of frequency when a transmitting device is in proximity to a person. Performing transmit power cutback when not required would limit the range of a communication device. However, accurately detecting proximity of a human to a communication device requires addition of a number of sensors and active components to the communication device. Generally known 4G devices often include circuitry that detect human proximity by capacitive changes to antenna impedance. For instance, switches are also included on a housing of a portable communication device to detect contact with the user's hand. In addition, some communication devices that have an earpiece speaker include ultrasonic sensors to detect proximity of a user's ear to the communication device. Some devices include infrared sensors to detect presence or proximity of some object to the communication device. These additional components increase the manufacturing cost and power consumption of the communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, a communication device, a method, and a computer program product enable passive sensing of proximity of a person. The proximity sensing is passive in that the communication device itself does not include any special proximity sensing component and does not transmit a signal but "senses" (or determines) proximity based on a change in the signal being received from another device. Proximity detection is based on a characteristic of the downlink reference signal, and the detection is used for making transmit cutback decisions. In one or more embodiments, one or more antennas of the communication device receives the downlink reference signal from a radio access network (RAN). A frontend of the communication device determines a downlink characteristic of the downlink reference signal. A controller of the communication device compares the downlink characteristic to a baseline threshold value. According to one or more embodiments, the baseline threshold value is imperially established and correlates to downlink characteristics that is indicative of proximity of a human to the communication device. The controller determines whether a person is in proximity to the one or more antennas based on the downlink characteristic being indicative of the proximity to the person. The controller limits transmit power level of the frontend in response to determining that the downlink characteristic is indicative of the proximity to the person.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

Figure 1:
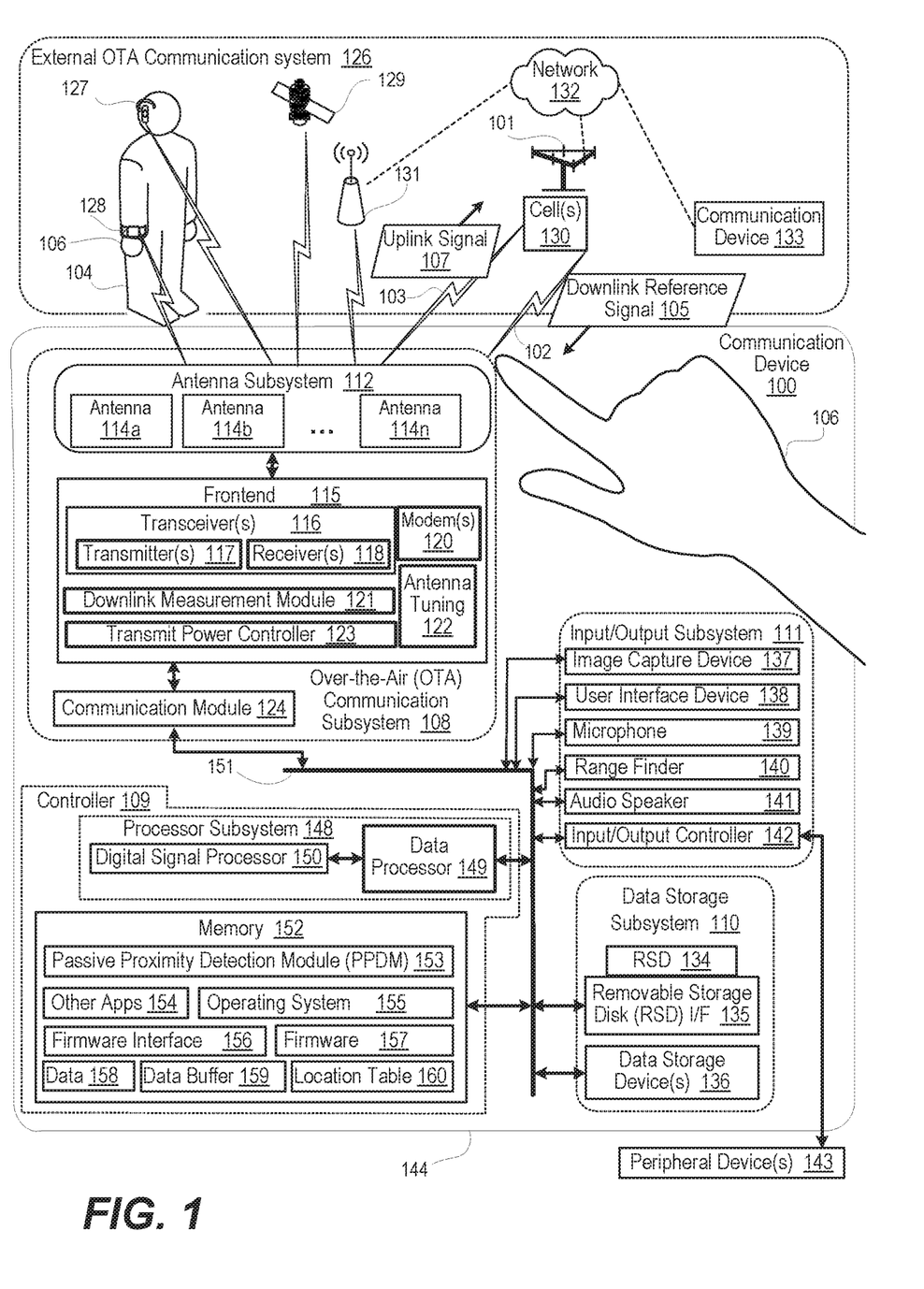
FIG. 1 is a functional block diagram of a communication device that passively detects proximity to a person based on characteristics of downlink reference signal, according to one or more embodiments.

FIG. 1 is a functional block diagram of example communication device 100 that communicates with radio access network (RAN) 101 via downlink 102 from RAN 101 and uplink 103 to RAN 101. Communication device 100 passively detects proximity to person 104 based on characteristics of downlink reference signal 105 received via downlink 102 from RAN 101. In response to detecting proximity, such as to hand 106 of person 104, communication device 100 can limit transmit power of uplink signal 107 on uplink 103. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. These various devices all provide and/or include the necessary hardware and software to support the various wireless or wired communication functions as part of a communication system. Communication device 100 can be intended to be portable, hand-held, wearable, detachable, positioned in a fixed location, or mounted to a movable vehicle.

Referring now to the specific component makeup and the associated functionality of the presented components. In one or more embodiments, communication device 100 includes over-the-air (OTA) communication subsystem 108, controller 109, data storage subsystem 110, and input/output subsystem 111. OTA communication subsystem 108 includes antenna subsystem 112 having antenna elements 114a-114n. OTA communication subsystem 108 includes frontend 115 having transceiver(s) 116 that includes transmitter(s) 117 and receiver(s) 118. Frontend 115 further includes modem(s) 120, downlink measurement module 121, antenna tuning circuitry 122, and transmit power controller 123. OTA communication subsystem 108 includes communication module 124. OTA communication subsystem 108 communicates with external OTA communication system 126. External OTA communication system 126 can include devices such as wireless headset 127 and smart watch 128 that are respectively worn by person 104. External communication system 126 can include global positioning system (GPS) satellites 129, cell(s) 130 of RANs 101, node 131, network(s) 132, and other communication devices 133.

Data storage subsystem 110 of communication device 100 includes removable storage device (RSD) 134, RSD interface (I/F) 135, and data storage device(s) 136. In one or more embodiments, removable storage device (RSD) 134 that is received in RSD interface 135 is a computer program product or computer readable storage device, which can be referred to as non-transitory. RSD 134 can be accessed by controller 109 to provision communication device 100 with program code. When executed by controller 109, the program code provides the functionality described herein to communication device 100. Data storage subsystem 110 provides nonvolatile storage that is accessible by controller 109. For example, data storage subsystem 110 can provide a large selection of other applications 154 that can be loaded into system memory 152. In one or more embodiments, local data storage device(s) 136 includes hard disk drives (HDDs), optical disk drives, solid state drives (SSDs), etc.

I/O subsystem 111 includes image capturing device 137, user interface device 138, microphone 139, range finder 140, audio speaker 141, and I/O controller 142 that connects to peripheral devices 143 external to housing 144 of communication device 100. I/O subsystem 111 includes external and embedded input and output devices. Image capturing device 137, such as a camera, can receive and/or capture gestures and other image data. Image capturing device 137 generates still images and video. User interface device 138 provides display and, in some embodiments, a touch screen interface that enables touch controls. Microphone 139 receives user audible inputs. Range finder 140 emits a waveform of energy, such as acoustic, infrared, RF, etc., whose time of flight is used to measure distance to a reflecting object. Audio speaker 141 provides audio output, including audio playback and alerts. In one or more embodiments, I/O controller 142 connects to one or more peripheral devices 143 that can include/provide additional I/O functionality. I/O controller 142 can also interface to a wired local access network (LAN) (not shown).

Controller 109 includes processor subsystem 148 that includes one or more central processing units (CPUs) ("data processor") 149 that are communicatively coupled, via system interlink 151, to system memory 152. Processor subsystem 148 can include one or more digital signal processors 150 that are integrated with data processor 149 or are communicatively coupled to data processor 149. System memory 152 includes applications such as passive proximity detection module 153 and other application(s) 154. System memory 152 further includes operating system 155, firmware interface (I/F) 156, such as basic input/output system (BIOS) or Uniform Extensible Firmware Interface (UEFI), and other firmware 157. System memory 152 includes data 158 used by passive proximity detection module 153 and other applications 154. System memory 152 includes data buffer 159 used by passive proximity detection module 153. System memory 152 also includes location table 160 used by passive proximity detection module 153. As further depicted in FIG. 2, data buffer 159 can include a first in first out (FIFO) buffer for a physical grouping of one or more antenna elements 114a-114n, such as A-D. The grouping can operate together as antenna array modules 202a-202d. At regular time intervals $t_0, t_{-1}, t_{-2}, \ldots t_{-n}$, downlink characteristics are measured for each of antenna array modules 202a-202d and recorded in respective FIFO buffers. In one or more embodiments, the baseline threshold value can be based on a comparison to historical downlink characteristics that are tracked by controller 109 in location table 160. Location table 160 can include records for visited locations 1-Z. Each location can be defined as a distance from a particular RAN 101. Location can be defined and indexed by geographic coordinate(s) such as provided by location services that use signals from GPS satellites 129. Each location can be defined as a triangulated position from two or more RANs 101. Identifier for a particular RAN 101 can index maximum or baseline values for downlink characteristics. The location is sufficiently granular such that unimpeded transmissions are expected to have the same maximum value for the same RAN 101. A baseline threshold value is determined based on the measured maximum downlink characteristic and stored in location table 160.

Returning to FIG. 1, processor subsystem 148 of controller 109 executes program code to provide operating functionality of communication device 100. These software and/or firmware modules have varying functionality when their corresponding program code is executed by processor subsystem 148 or secondary processing devices within communication device 100. Downlink measurement module 121 determines characteristics of downlink reference signal 105. Processor subsystem 148 of controller 109 can execute program code of passive proximity detection module 153 to access the characteristics of downlink reference signal 105. Based on the characteristics, controller 109 sets a value of power cutback that is implemented by transmit power controller 123.

Controller 109 also controls the various functions and/or operations of communication device 100. These functions and/or operations include, but are not limited to including, application data processing, communication with other communication devices 133, navigation tasks, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard wired logic.

In one or more embodiments, controller 109 of communication device 100 is communicatively coupled via system interlink 151 to OTA communication subsystem 108, data storage subsystem 110, and input/output subsystem 111. System interlink 151 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 151) are illustrated in FIG. 1, it is to be understood that more, fewer, or different interconnections may be present in other embodiments.

Communication module 124 of OTA communication subsystem 108 operates in baseband frequency range to encode data for transmission and decode received data, according to a communication protocol. Modem(s) 120 modulate baseband encoded data from communication module 124 onto a carrier signal to provide a transmit signal that is amplified by transmitter(s) 117. Modem(s) 120 demodulates the received signal from cell(s) 130 or node 131 detected by antenna subsystem 112. The received signal is amplified and filtered by receiver(s) 118, which demodulate received encoded data from a received carrier signal. Antenna tuning circuitry 122 adjusts antenna impedance of antenna subsystem 112. Antenna tuning circuitry 122 improves antenna efficiency at desired transmit or receive frequencies of transmitter(s) 117 and receiver(s) 118, respectively, within transceiver(s) 116. Antenna tuning circuitry 122 is electrically coupled to antenna subsystem 112 and compensates for any lossy dielectric effect of being proximate to person 104. In one or more embodiments, antenna subsystem 112 includes multiple antenna elements 114a-114n that are individually tuned to selected RF bands to support different RF communication bands and protocols. Antenna elements 114a-114n can be used in combination for multiple input multiple output (MIMO) operation for beam steering and spatial diversity.

In one or more embodiments, controller 109, via OTA communication subsystem 108, performs multiple types of OTA communication with external OTA communication system 126. OTA communication subsystem 108 can communicate via Bluetooth connection with one or more personal access network (PAN) devices, such as wireless headset 127 and smart watch 128. Communication via Bluetooth connection includes both transmission and reception via a Bluetooth transceiver device. In one or more embodiments, OTA communication subsystem 108 communicates with one or more locally networked devices via a wireless local area network (WLAN) link provided by node 131. Node 131 is connected to wide area network 132, such as the Internet. In one or more embodiments, OTA communication subsystem 108 communicates with GPS satellites 129 to obtain geospatial location information. In one or more embodiments, OTA communication subsystem 108 communicates with RANs 101 having respective base stations (BSs) or cells 130. RANs 101 are a part of a wireless wide area network (WWAN) that is connected to wide area network 132.

Figure 2:
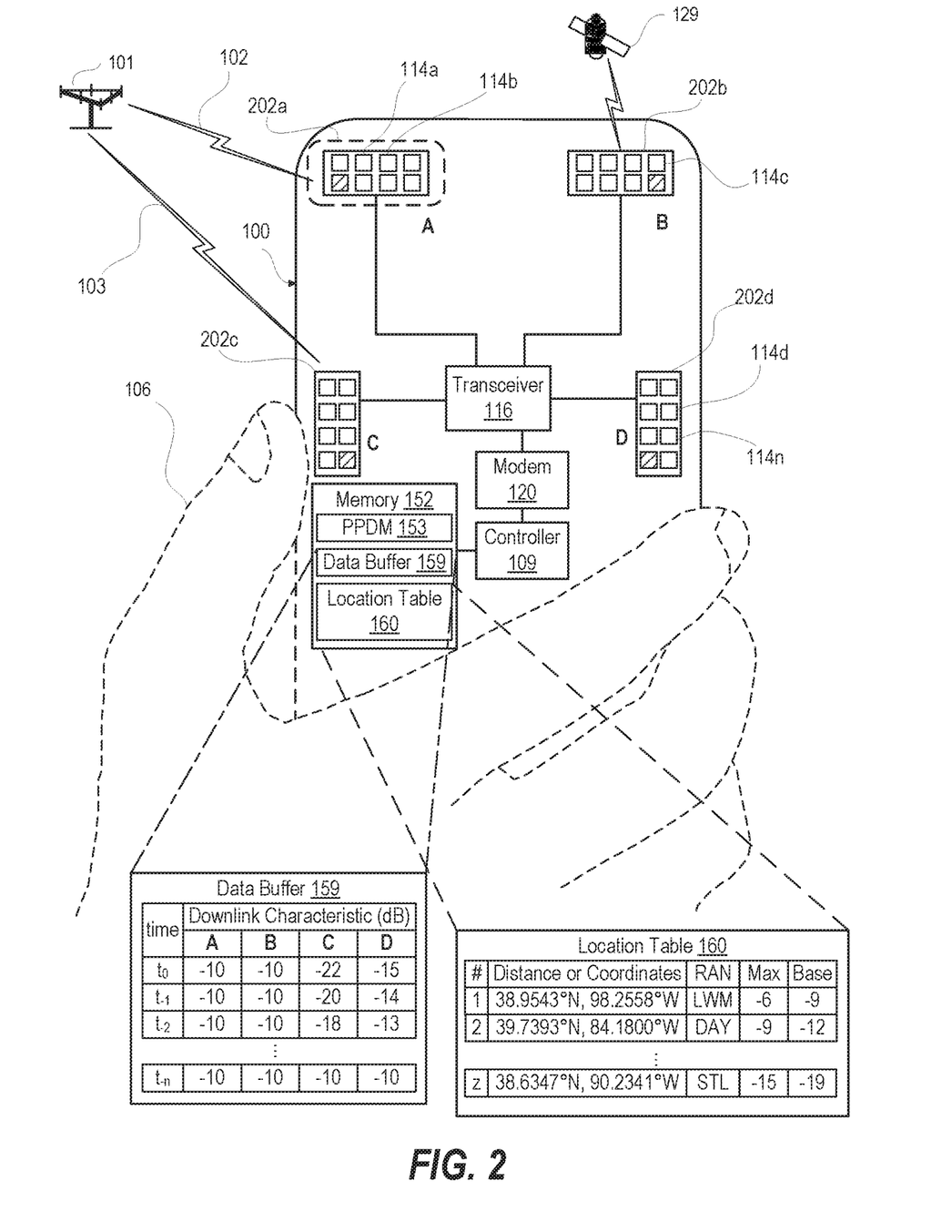
FIG. 2 is a front cutaway view of an example communication device held by a hand, according to one or more embodiments.

FIG. 2 depicts a front cutaway view of communication device 100 held by hand 106 of a user (not shown). In one or more embodiments, communication device 100 includes antenna array modules 202a-202d having antenna elements 114a-114n that support fifth generation (5G) mobile communications of downlink 102 from and uplink 103 to RAN 101. 5G mobile communications depend on millimeter wave (mmWave) frequencies (>24 GHz). Some definitions of millimeter waves refer to 1-10 mm wavelength with corresponding frequencies of 30-300 GHz (extremely high frequency (EHF) band). The present disclosure refers to mmWave as including the range 30-300 GHz as well as a lower frequency of 24-86 GHz used by 5G. Antenna array modules 202a-202d establish a wireless link at mmWave frequencies. Communication device 100 generally requires steerable antenna patterns of very high gain, on the order of 12 dB relative to an isotropic radiator. Antenna array modules 202a-202d can support diversity and multiple input multiple output (MIMO) applications. The larger the number of antenna elements 114a-114n, the higher is the peak array gain. Increasing antenna gain can require an increased number of antenna elements 114a-114n. In one or more embodiments, each necessary transceiver 116 of communication device 100 requires implementing on the order of 16-64 antenna elements 114a-114n.

Communication device 100 controls transmit power according to regulation standards by: (i) distinguishing between free space (no human body close by) and close-to-body scenarios; and (ii) reducing transmit power if a human body is closed by (or in proximity to) or touching communication device 100. Controller 109 determines the proximity without relying on active proximity sensors, which would increase the cost and power consumption of communication device 100. By monitoring changes in the downlink reference signal, communication device 100 can learn to differentiate free space to human body proximity situations for a particular location and context.

The present disclosure contemplates and addresses the characteristics of mmWave communication bands that are different from communication bands used by prior cellular communication technologies. At millimeter wave frequencies, human tissues (skin, muscle etc.) are lossy. The skin penetration depth is much lower corresponding to the shorter wavelength of mmWave signal as compared to low frequencies (e.g. 900 MHz) of earlier telecommunication standards that have longer wavelength. Calculated electrical conductivity of human skin is 21.8 siemens/meter (S/m) (loss tangent tan 6=1.05). Simulations show that the hand reduces the peak gain of a 2×2 mmWave antenna array by at least 12 dB when the array surface is 5 mm away from the hand. In a wireless communication system, link margin, measured in dB, is the difference between a receiver's sensitivity and the expected minimum received power. A common transmission scenario demonstrates the impact of this reduction in link margin. This drop in peak gain is significant considering the link margin is about 12 dB for a cell size of 50 m in non-line of sight (NLOS) cases. The link margin of 12 dB is insufficient in the presence of other communication devices 133 (FIG. 1) that act as interferers that can require additional link margin to mitigate interference. The hand absorption of 12 dB will break the mmWave communication link in these circumstances. The degradation in peak gain will be even more when this separation distance of the hand or face to the communication device is less than 5 mm.

Overcoming the degradation in peak gain on a transmission uplink is limited by governmental and industry regulation. Specific regulations are defined/established for electromagnetic power deposition at millimeter wave frequencies when in proximity to a person. Relatively small increases in separation distances can avoid transmit power cutback requirements, such as being several centimeters away from an antenna array. Controller 109 selects unaffected antenna arrays for mmWave uplink transmission based on knowing which antenna arrays of a communication device are required to be deactivated or cutback due to proximity. FIG. 2 depicts antenna array module 202c in proximity to hand 106. Antenna array modules 202a, 202b, and 202d are not in proximity to hand 106. The present disclosure enables determination of the proximity of a human using the downlink characteristics on each of the antennas, and particularly antenna array module 202c. The determination is made without the addition of the large number of touch or capacitance sensors that would otherwise be required to monitor all of the antenna array modules 202a-202d. The present disclosure also enables this determination without active transmissions from antenna array modules 202a-202d or range finder 140 (FIG. 1) that require additional power consumption.

In one or more embodiments, controller 109 makes 5G mmWave cutback decisions, including disabling one or more of mmWave antenna array modules 202a-202d or reducing transmit power level. The cutback decision(s) is/are based on characterizing one or more of 5G mmWave downlink reference signal strength indicator (RSSI), downlink reference signal received power (RSRP), and reference signal received quality (RSRQ). 5G mmWave RSSI, RSRP and RSRQ are very low-level basic RF signal indicators that indicates radio frequency (RF) link quality and provide a reliable method to determine current 5G status. Controller 109 can determine whether mmWave RSSI, RSRP or RSRP for one or more antenna array modules is too low for synchronizing to 5G quadrature phase shift keying (QPSK) or quadrature amplitude modulation (QAM). If unable to synchronize due to transmit power cutback, the affected antenna array modules 202a-202d are not used.

In one or more embodiments, controller 109 can determine a baseline threshold value for determining proximity of a person based on a real-time trend in downlink characteristics in data buffer 159. For each antenna array module 202a-202d ("A", "B", "C", and "D"), downlink characteristics are tracked in a first in first out (FIFO) manner for a running time sequence $t_0, t_{-1}, t_{-2}, \ldots t_{-n}$. A pattern of decreasing downlink characteristics for a particular antenna array module 202c "C" can be indicative of proximity of a person. Using a threshold is one way to determine an indication of proximity to a person. For example, the downlink characteristic decreases for antenna array module 202c "C" in magnitude or rate for a period of time that exceed a threshold. The threshold can be based on a comparison to the same antenna array module 202c "C". The threshold can be based on a comparison to other antenna array modules 202a, 202b, and 202d. Another antenna array module 202d "D" can exhibit a decrease that is not sufficiently indicative of proximity to a person. By basing proximity on changes in downlink characteristics, controller 109 can adapt to a wide range of rapid interactions of a user with antenna array modules 202a-202d.

Figure 3A:
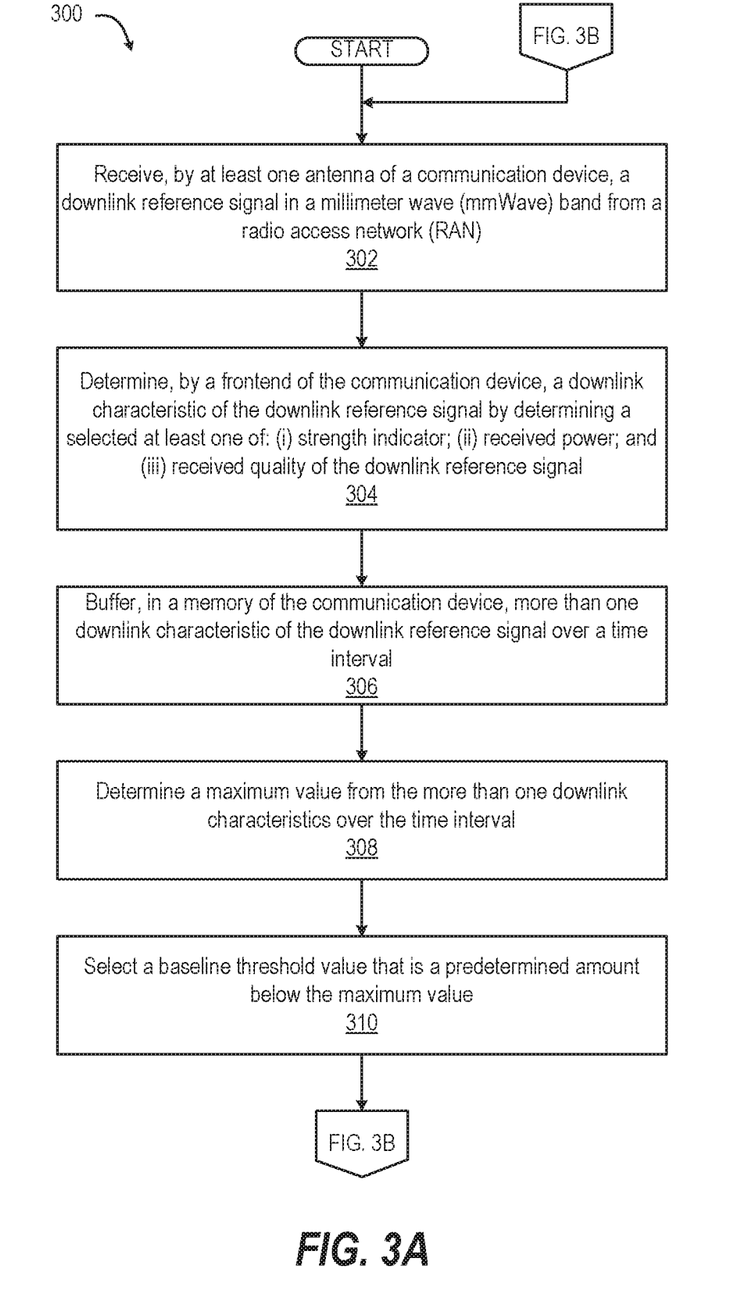
FIGS. 3A-3B present a flow diagram of a method for controlling transmit power cutback of a communication device based on passive detection of proximity of a human, according to one or more embodiments.
Figure 3B:
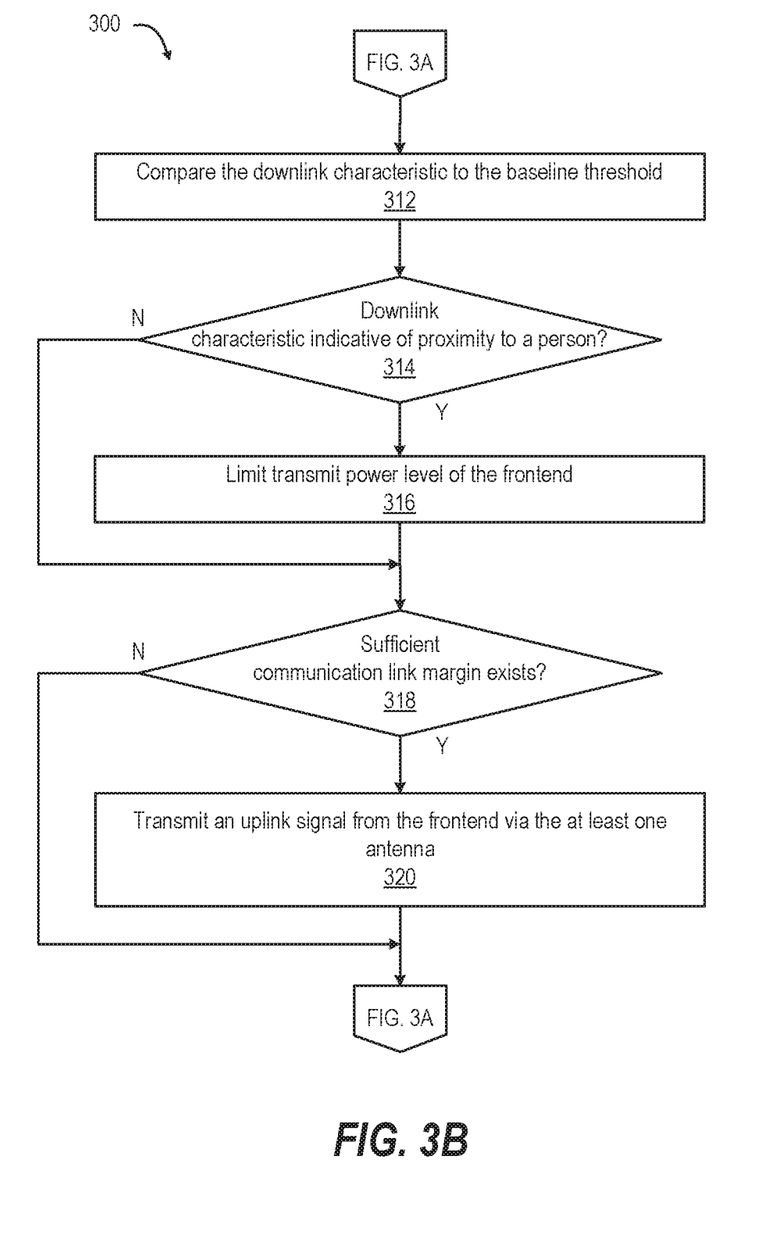

FIGS. 3A-3B present a flow diagram of method 300 for controlling transmit power cutback of communication device 100 (FIG. 1) based on passive sensing of proximity of a person. Controller 109 (FIG. 1) enables communication device 100 (FIG. 1) to perform method 300. With reference to FIG. 3A, method 300 includes receiving, by at least one antenna of communication device 100, a downlink reference signal from a radio access network (RAN) 101 (FIG. 1) (block 302). In one or more embodiments, the at least one antenna is one or more antenna elements 114a-114n (FIG. 1). In one or more embodiments, the at least one antenna is one or more antenna array modules 202a-202d (FIG. 2). In one or more embodiments, the downlink reference signal is a millimeter wave (mmWave) band signal. Method 300 includes determining, by frontend 115 (FIG. 1) of communication device 100, a downlink characteristic of the downlink reference signal by determining a selected one or more of: (i) strength indicator; (ii) received power; and (iii) received quality of the downlink reference signal (block 304). In one or more embodiments, method 300 includes buffering, in memory 152 (FIG. 1) of communication device, more than one downlink characteristic of the downlink reference signal over a time interval (block 306). The time interval can be selected to be short enough to avoid significant changes in the downlink reference signal due to changes in distance between RAN and communication device. Controller 109 (FIG. 1) determines a maximum value from the more than one downlink characteristics over the time interval (block 308). Method 300 includes selecting, as a baseline threshold value, a value that is a predetermined amount below the maximum value (block 310).

With reference to FIG. 3B, method 300 includes comparing, by controller 109 (FIG. 1), the downlink characteristic to the baseline threshold value (block 312). A determination is made, in decision block 314, whether a person is in proximity to the at least one antenna based on the downlink characteristic of the at least one antenna being indicative of a proximity to the person. In response to determining that downlink characteristic is indicative of a proximity to the person, method 300 includes limiting transmit power level of the frontend (block 316). In response to determining that downlink characteristic is not indicative of a proximity to the person in decision block 314 or after limiting transmit power in block 316, a determination is made, in decision block 318. The determination is made whether sufficient communication link margin exists, based at least in part on the downlink characteristic, available antenna gain, any interfering uplink signal, and any transmit power limitation. In response to determining that sufficient communication link margin exists, method 300 includes transmitting an uplink signal from the frontend via the at least one antenna. Then method 300 ends. In response to determining that sufficient communication link margin does not exist, method 300 returns to block 302 (FIG. 3A). In one or more embodiment, method 300 can include a number such as 3-30 of spaced attempts over a period of time such as 0.1-3.0 seconds in response to determining that sufficient communication link margin does not exist.

Figure 4A:
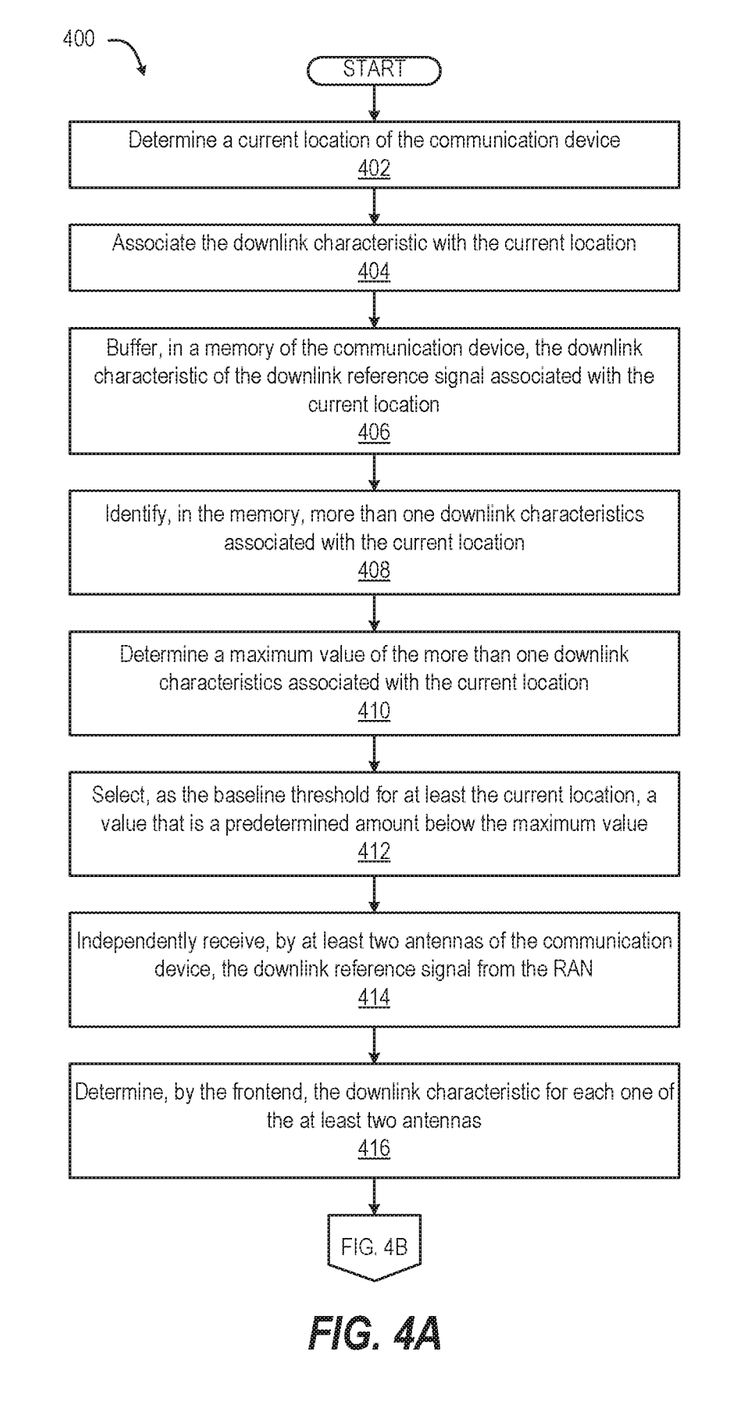
FIGS. 4A-4B present a flow diagram of a method for controlling transmit power cutback of selected antenna array modules of a communication device, based on passive detection of proximity of a human, according to one or more embodiments.
Figure 4B:
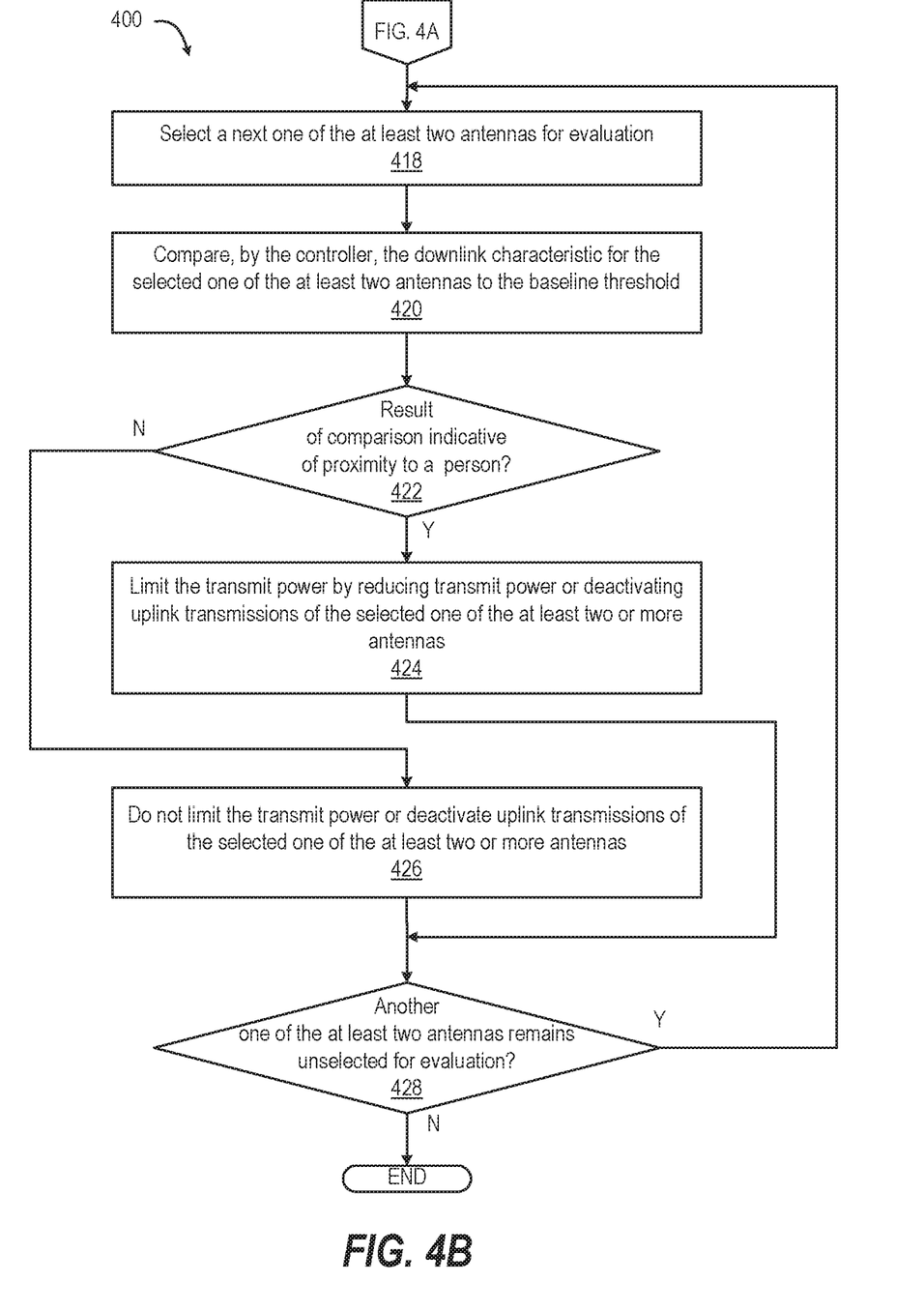

FIGS. 4A-4B present a flow diagram of method 400 for transmit controlling power cutback of selected antenna array modules 202a-202d of communication device 100 (FIG. 2). Controller 109 (FIG. 2) enables communication device 100 (FIG. 2) to perform method 400. With reference to FIG. 4A, method 400 includes determining, by the controller, a current location of the communication device (block 402). Method 400 includes associating, by controller 109 (FIG. 2), the downlink characteristic with the current location (block 404). Method 400 includes buffering, in a memory of the communication device, the downlink characteristic of the downlink reference signal associated with the current location (block 406). Controller 109 (FIG. 2) identifies, in the memory, more than one downlink characteristics associated with the current location (block 408). Method 400 includes determining a maximum value of the more than one downlink characteristics associated with the current location (block 410). Method 400 includes selecting, as the baseline threshold value for at least the current location, a value that is a predetermined amount below the maximum value (block 412). Method 400 includes independently receiving, by at least two antennas of the communication device, the downlink reference signal from the RAN (block 414). Method 400 includes determining, by the frontend, the downlink characteristic for each one of the at least two antennas (block 416).

With reference to FIG. 4B, method 400 includes selecting a next one of the at least two antennas for evaluation (block 418). Method 400 includes comparing, by the controller, the downlink characteristic for the selected one of the at least two antennas to the baseline threshold value (block 420). A determination is made, in decision bock 422, whether the result of the comparison of a respective downlink characteristic and the baseline threshold value is indicative of a proximity to the person. In one or more embodiments, the result of the comparison being indicative of a proximity to the person is based on one downlink characteristic being less than the baseline threshold value. In one or more embodiments, the result of the comparison being indicative of a proximity to the person is based on a sequence of more than one downlink characteristic being less than the baseline threshold value. In one or more embodiments, the result of the comparison being indicative of a proximity to the person is based on a sequence of more than one downlink characteristic having a negative rate of change that is less than the baseline threshold value. In response to determining that the result of the comparison is indicative of the proximity to the person, method 400 includes limiting the transmit power of the selected one or more of the at least two antennas. Limiting transmit power can be performed by reducing transmit power or by deactivating uplink transmissions (block 424). In response to determining that the result is not indicative of the proximity to the person, method 400 includes not limiting the transmit power and not deactivating uplink transmissions of the selected one or more of the at least two antennas (block 426). Subsequent to executing one of blocks 424 and 426, method 400 includes determining, in decision block 428, whether another one of the at least two antennas remains unselected for evaluation. In response to determining that another one of the at least two antennas remains unselected for evaluation, method 400 returns to block 418. In response to determining that another one of the at least two antennas does not remain unselected for evaluation, method 400 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   receiving, by at least one antenna of a communication device, a downlink reference signal from a radio access network (RAN);
   determining, by a frontend of the communication device, a downlink characteristic of the downlink reference signal;
   comparing, by a controller of the communication device, the downlink characteristic to a baseline threshold value;
   determining whether a person is in proximity to the at least one antenna based on the downlink characteristic being indicative of a proximity to the person; and
   limiting transmit power level of the frontend in response to determining that the downlink characteristic is indicative of the proximity to the person.

2. The method of claim 1, wherein receiving the downlink reference signal comprises receiving a millimeter wave (mmWave) band signal.

3. The method of claim 2, wherein determining the downlink characteristic comprises determining a selected at least one of: (i) strength indicator; (ii) received power; and (iii) received quality of the downlink reference signal.

4. The method of claim 2, further comprising:
   determining whether the downlink characteristic is greater than a minimum threshold for attempting a mmWave communication session; and
   enabling uplink transmission in response to determine that the downlink characteristic is greater than a minimum threshold for attempting the mmWave communication session.

5. The method of claim 1, further comprising:
   independently receiving, by at least two antennas of the communication device, the downlink reference signal from the RAN;
   determining, by the frontend, the downlink characteristic for each one of the at least two antennas;
   comparing, by the controller, the downlink characteristic for each one of the at least two antennas to the baseline threshold value;
   determining whether a person is in proximity to one or more of the at least two antennas based on a respective downlink characteristic being indicative of a proximity to the person; and
   limiting the transmit power by deactivating uplink transmissions of one or more of the at least two or more antennas in response to determining that the corresponding downlink characteristic is indicative of the proximity to the person for the particular one or more of the at least two antennas.

6. The method of claim 5, further comprising:
   determining a maximum value of the downlink characteristics for each one of the at least two antennas; and
   selecting, as the baseline threshold value, a value that is a predetermined amount below the maximum value.

7. The method of claim 1, further comprising:
   buffering, in a memory of the communication device, more than one downlink characteristic of the downlink reference signal over a time interval;
   determining a maximum value from the more than one downlink characteristics over the time interval; and
   selecting, as the baseline threshold value, a value that is a predetermined amount below the maximum value.

8. The method of claim 1, further comprising:
   determining a current location of the communication device;
   associating the downlink characteristic with the current location;
   buffering, in a memory of the communication device, the downlink characteristic of the downlink reference signal associated with the current location;
   identifying, in the memory, more than one downlink characteristics associated with the current location;
   determining a maximum value of the more than one downlink characteristics associated with the current location; and
   selecting, as the baseline threshold value for at least the current location, a value that is a predetermined amount below the maximum value.

9. The communication device of claim 8, further comprising one or more antenna array modules that contain the one or more antennas.

10. The method of claim 1, further comprising:
determining whether an interfering uplink transmission is present; and
in response to determining that an interfering uplink transmission is present:
determining, by the controller, whether sufficient communication link margin exists, based at least in part on the downlink characteristic, available antenna gain, and any transmit power limitation; and
in response to determining that sufficient communication link margin exists, transmitting an uplink signal from the frontend via the at least one antenna.

11. A communication device comprising:
at least one antenna that receives and transmits signals;
a frontend communicatively coupled to the at least one antenna and that converts downlink signals to downlink baseband signals and uplink baseband signals to uplink signals;
a memory containing a passive proximity detection module and a baseline threshold value; and
a controller communicatively coupled to the frontend and the memory, and that executes the passive proximity detection module to enable the communication device to:
receive via the one or more antennas a downlink reference signal from a radio access network (RAN);
determine, by the frontend, a downlink characteristic of the downlink reference signal;
compare the downlink characteristic to the baseline threshold value;
determine whether a person is in proximity to the one or more antennas based on the downlink characteristic being indicative of a proximity to the person; and
limit transmit power level of the frontend in response to determining that the downlink characteristic is indicative of the proximity to the person.

12. The communication device of claim 11, wherein, to receive the downlink reference signal, the controller enables the communication device to receive a millimeter wave (mmWave) signal.

13. The communication device of claim 12, wherein, to determine the downlink characteristic, the controller enables the communication device to determine a selected at least one of: (i) strength indicator; (ii) received power; and (iii) received quality of the downlink reference signal.

14. The communication device of claim 12, wherein the controller enables the communication device to:
determine whether the downlink characteristic is greater than a minimum threshold for attempting a mmWave communication session; and
enable uplink transmission in response to determine that the downlink characteristic is greater than a minimum threshold for attempting an mmWave communication session.

15. The communication device of claim 11, wherein the controller enables the communication device to:
independently receive, by at least two antennas of the communication device, the downlink reference signal from the RAN;
determine, by the frontend, the downlink characteristic for each one of the at least two antennas;
compare the downlink characteristic for each one of the at least two antennas to the baseline threshold value;
determine whether a person is in proximity to each one of the at least two antennas based on a respective downlink characteristic being indicative of a proximity to the person; and
limit the transmit power by deactivating uplink transmissions of one or more of the at least two or more antennas in response to determining that the corresponding downlink characteristic is indicative of the proximity to the person for the particular one or more of the at least two antennas.

16. The communication device of claim 15, wherein the controller enables the communication device to:
determine a maximum value of the downlink characteristics for each one of the at least two antennas; and
select, as the baseline threshold value, a value that is predetermined amount below the maximum value.

17. The communication device of claim 11, wherein the controller enables the communication device to:
buffer in memory of the communication device, more than one downlink characteristic of the downlink reference signal over a time interval;
determine a maximum value from the more than one downlink characteristics over the time interval; and
select, as the baseline threshold value, a value that is predetermined amount below the maximum value.

18. The communication device of claim 11, wherein the controller enables the communication device to:
determine a current location of the communication device;
associate the downlink characteristic with the current location;
buffer, in a memory of the communication device, the downlink characteristic of the downlink reference signal associated with the current location;
identify in the memory more than one downlink characteristics associated with the current location;
determine a maximum value of the more than one downlink characteristics associated with the current location; and
select, as the baseline threshold value for at least the current location, a value that is a predetermined amount below the maximum value.

19. The communication device of claim 11, wherein the controller enables the communication device to:
determine whether an interfering uplink transmission is present; and
in response to determining that an interfering uplink transmission is present:
determine whether sufficient communication link margin exists based at least in part on the downlink characteristic, available antenna gain, and any transmit power limitation; and
in response to determining that sufficient communication link margin exists, transmit an uplink signal from the frontend via the at least one antenna.

20. A computer program product comprising:
a computer readable storage device; and
program code on the computer readable storage device that when executed by a processor associated with a communication device having one or more antennas coupled to a front end, the program code enables the communication device to provide the functionality of:
receiving, by the one or more antennas, a downlink reference signal from a radio access network (RAN);

determining, by the frontend, a downlink characteristic comprising a selected one or more of received power and received quality of the downlink reference signal;

comparing, by a controller of the communication device, the downlink characteristic to a baseline threshold value;

determining whether a person is in proximity to the one or more antennas based on the downlink characteristic being indicative of a proximity to the person; and limiting transmit power level of the frontend in response to determining that the downlink characteristic is indicative of the proximity to the person.

* * * * *